United States Patent [19]
Mott

[11] Patent Number: 6,106,425
[45] Date of Patent: Aug. 22, 2000

[54] SINGLE ASSEMBLY PHASED CHAIN

[75] Inventor: Philip J. Mott, Dryden, N.Y.

[73] Assignee: Borg-Warner Automotive, Inc., Troy, Mich.

[21] Appl. No.: 09/156,235

[22] Filed: Sep. 18, 1998

[51] Int. Cl.[7] .............................. F16H 7/06; F16G 13/02
[52] U.S. Cl. ............................................ 474/219; 474/156
[58] Field of Search ...................... 474/202, 219, 474/156, 224, 214, 84, 85, 88; 403/155, 154, 161, 386, 388, 389, 396

[56] References Cited

U.S. PATENT DOCUMENTS

| | | | |
|---|---|---|---|
| 687,146 | 11/1901 | Fleckenstein | 474/84 |
| 3,659,472 | 5/1972 | Engels | 474/84 |
| 4,186,617 | 2/1980 | Avramidis | 74/245 |
| 4,738,654 | 4/1988 | Cole, Jr. | 474/219 |
| 5,507,697 | 4/1996 | Ledvina et al. | 474/85 |
| 5,562,557 | 10/1996 | Ledvina et al. | 474/84 |
| 5,645,502 | 7/1997 | Wakabayashi et al. | 474/85 |
| 5,683,319 | 11/1997 | Mott et al. | 474/85 |
| 5,797,697 | 8/1998 | Keller | 403/396 |

*Primary Examiner*—Tamara L. Graysay
*Assistant Examiner*—Matthew A. Kaness
*Attorney, Agent, or Firm*—Sidley & Austin; Greg Dziegielewski

[57] ABSTRACT

A chain and sprocket system includes a plurality of chain assemblies and phased or offset sprockets. The individual chain assemblies are interconnected by a retention bracket to form a single composite chain assembly.

20 Claims, 7 Drawing Sheets

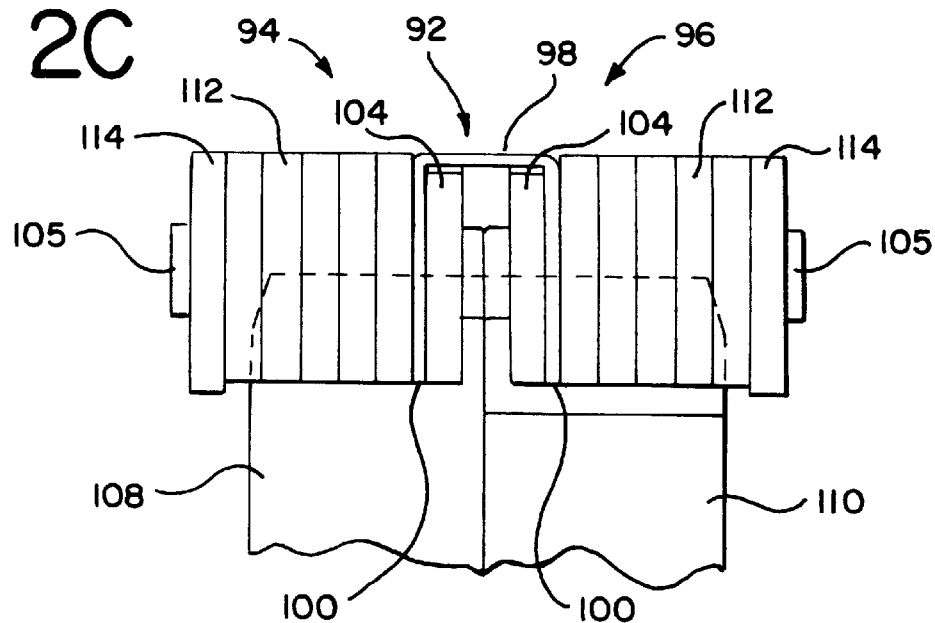
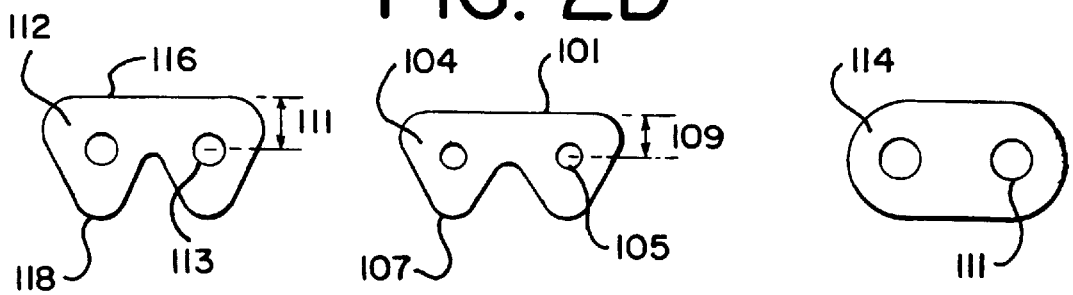
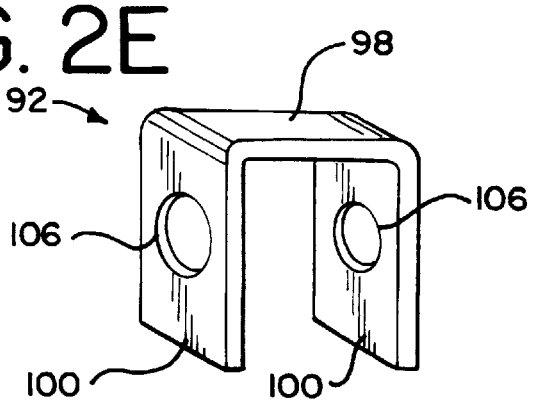

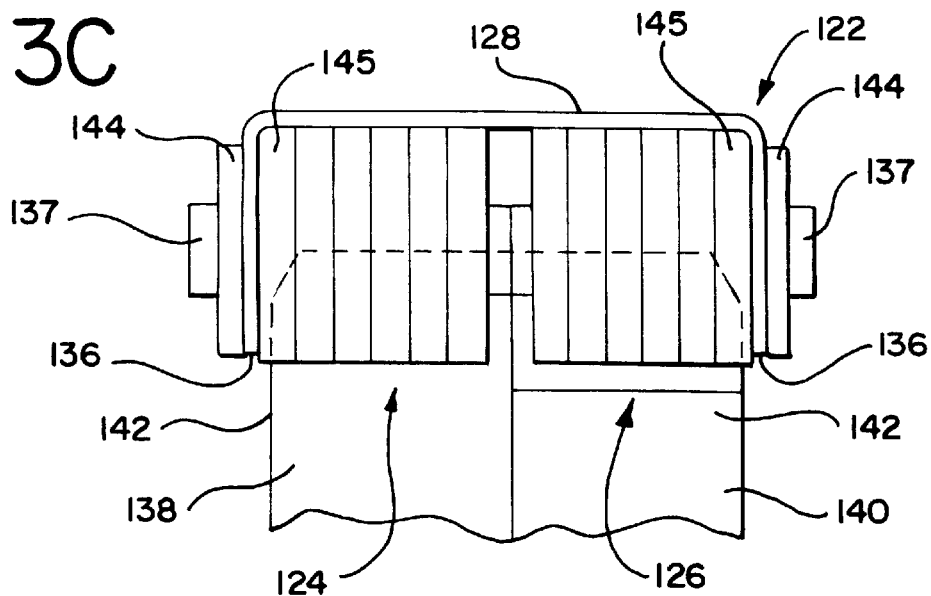
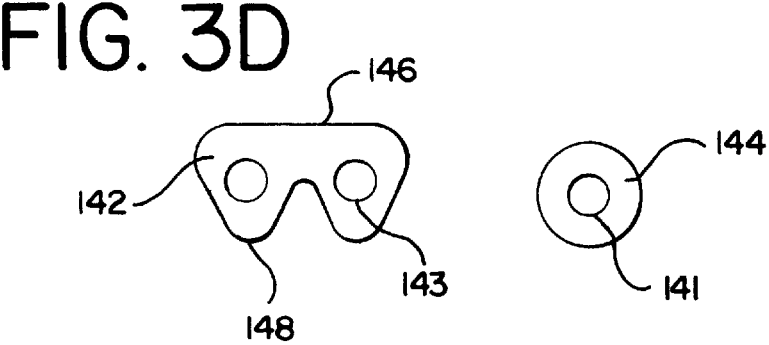
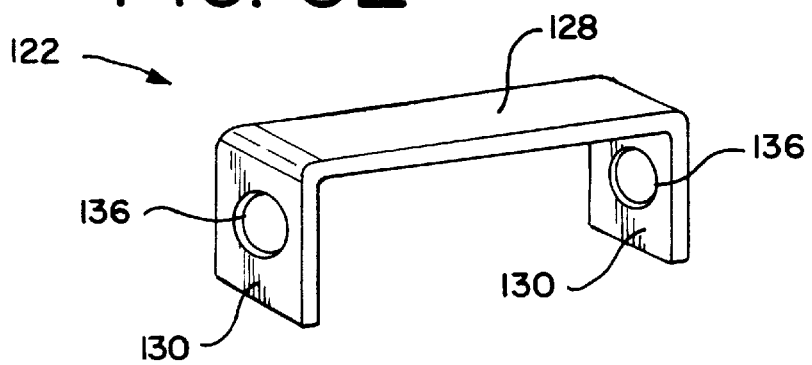

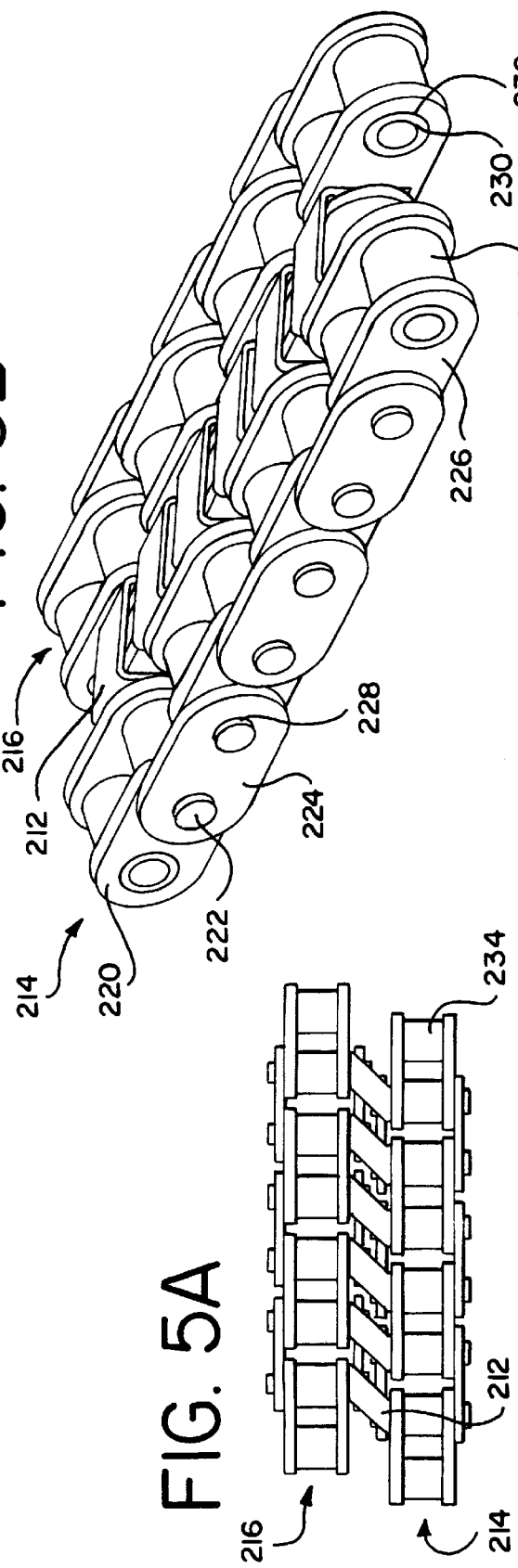

SINGLE ASSEMBLY PHASED CHAIN

BACKGROUND OF THE INVENTION

The present invention relates generally to power transmission chains, which are widely used in the automotive industry and in industrial applications. More specifically, the present invention is directed to a power transmission system employing a plurality of parallel, adjacent chain assemblies which are connected by a retention bracket to form a single composite chain assembly.

In a power transmission application, an endless chain is wound around at least two sprockets, with the sprocket teeth engaging the chain. The sprockets are mounted on rotatable shafts. Rotation of a driving sprocket causes power transmission through the chain and consequent rotation of at least one driven sprocket. For instance, in an engine timing system, a chain provides power transmission between at least one driving sprocket positioned on a crankshaft and at least one driven sprocket positioned on a camshaft. Other automotive applications include, for instance, power transmission from a torque converter to a transmission and power transmission in the transfer case of a four wheel drive vehicle.

One type of power transmission chain is a silent chain, or a chain with links having inverted teeth and at least one toothed sprocket on each rotating shaft. Power transmission between each sprocket and the chain, and consequently between one sprocket and another sprocket, is provided by the meshing of the sprocket teeth with the inverted teeth of the chain.

Silent chains are formed by an arrangement of link plates in lateral and longitudinal directions. The links are interlaced and joined by pins. A typical chain is composed of inner links, which contact the teeth of a sprocket to provide power transmission, and guide links, which do not provide power transmission. Guide links are employed to maintain the chain on the center of the sprocket when the chain is wound around the sprocket. A row of link plates, arranged in the lateral direction, typically has a number of inner links combined with guide links in the center or at both edges of the row. Each inner link plate typically comprises a body portion having a pair of apertures for receiving the pins, and at least one depending toe shaped to fit between the teeth of the sprocket and provide power transmission therewith. U.S. Pat. No. 5,437,581, which is incorporated herein by reference, shows a silent chain known in the art.

Another type of power transmission chain is a roller chain, where the sprocket teeth are received between rollers or bushings on the pins which connect the link plates of the chain. As with silent chains, roller chains are formed by an arrangement of link plates interleaved in lateral and longitudinal directions. A typical roller chain consists of alternate inner links and outer links. The outer links, which are sometimes known as "pin" or "guide" links, consist of spaced link plates each having a pair of ends and an opening or aperture in each end. Pins are tightly received in the apertures of the outer links. The inner links, which are sometimes known as "bushing links," consist of spaced link plates each having a pair of ends and an opening or aperture in each end. Bushings are tightly received in the apertures. The bushings freely rotate about the pins, so that the inner links are pivotally connected to the outer links and able to articulate with respect to the outer links.

In some roller chain designs, rollers are provided on the bushings, and when the roller chain is wrapped around a sprocket, the teeth of the sprocket are received between the laterally spaced link plates and contact the longitudinally spaced rollers. These types of roller chains are sometimes called "true roller" chains. In other roller chain designs, referred to as "rollerless" chains, rollers are not deployed on the bushings, and, instead, the sprocket teeth are received between and contact the bushings themselves. Examples of roller chain are found in U.S. Pat. Nos. 4,186,617 and 5,226,856, which are both incorporated herein by reference.

A conventional chain drive may include a chain assembly of extended width in order to provide a chain of greater strength. Alternatively, two chain assemblies may be placed side-by-side between pairs of sprockets in order to achieve the power transmission results equivalent to that of a single extended width chain.

The most basic conventional engine timing system typically includes a single sprocket on the camshaft, with the crankshaft sprocket having one-half the number of teeth of the camshaft sprocket. Such a camshaft typically controls the valve train operation through hydraulic lifters and rocker arms connected to the valve stems. The chain can be of a narrow width in construction, such as shown in U.S. Pat. No. 4,758,210, which is incorporated herein by reference.

One challenge in the design of power transmission systems is the noise generated during the operation of chain drives. Noise is generated by a variety of sources, such as the impact of sprocket teeth on the contact surfaces of the chain at the onset of engagement. The loudness of the impact sound is affected by, among other things, the impact velocity between the chain and the sprocket, and the mass of chain links contacting the sprocket at a particular moment or time increment.

The meshing impact sound is generally a periodic sound in chain drives. The impact sound is repeated with a frequency generally corresponding to the frequency of the chain meshing with the sprocket. This frequency is related to the number of teeth on the sprocket and the speed of the sprocket. The impact can produce sound having objectionable pure sonic tones.

Another cause of noise in chain drives is the chordal action of the chain and sprockets as the chain is driven about the sprockets. Chordal action occurs as the chain link initially engages the sprocket. The meshing of the chain and sprocket at the chain mesh frequency can cause a movement of the free chain or span (the part of the chain between the sprockets) in a direction perpendicular to the chain travel but in the same plane as the chain and sprockets (the "transverse" or "lateral" direction). This vibratory movement can also produce an objectionable pure sonic tone at the frequency of the chain mesh frequency or a derivative of it.

Many efforts have been made to minimize the objectionable pure sonic tones in chain drives by decreasing the noise level and pitch frequency distribution. The problem of noise reduction was addressed in U.S. Pat. No. 5,562,557, which is incorporated herein by reference, by various phasing relationships between the chain assembly and the sprockets. Phasing the chain and sprocket relationship can reduce the number of chain link teeth (or mass of chain) impacting the sprocket during a given time increment. Similarly, phasing the chain and sprocket relationship can alter or phase the chordal action or articulation of the chain and sprocket. Both of these phasing modifications, alone and in conjunction with the randomization of the chain and sprocket contacts, can alter the impact and chordal action generated sound patterns.

The phasing in U.S. Pat. No. 5,562,557 was achieved by modifying the chain assemblies as well as the sprockets. The modifications to the sprockets include the use of split sprockets which are phased by one-fourth, one-third, or one-half tooth space or pitch. The modifications to the chain assemblies include randomization or the use of single toe links in a single or dual chain assembly. To maintain the position of each chain assembly on its respective sprocket portion, the modifications include cutting a groove in the center of each sprocket portion, along which an inner guide link runs.

An inner guide link may also run along a groove between the sprocket portions. In U.S. Pat. No. 5,551,925, which is incorporated herein by reference, inner guide links are placed in a groove in the center between the phased sprocket portions. With inner guide links in the center groove, the guide links on the opposite or outer sides of the chain assemblies may be eliminated. Eliminating the guide links on either outer side of the chain assemblies allows a narrower phased chain and sprocket system.

While phasing of a silent chain drive reduces the level of noise generated by the impact and chordal action, such phased assembly has certain disadvantages. The phased assembly requires a groove on the sprocket that is expensive to cut. In addition, manufacture and assembly of the chain systems are difficult, and the chains must be of a matched set.

The present invention addresses these problems by providing a phased chain assembly with a retention bracket to hold the chains together. In this manner, the center groove of the sprocket is eliminated and the chain is assembled into a single composite assembly of the two chains.

Retention brackets have been used to prevent transverse movement of the pivot means in chain assemblies of the prior art. In U.S. Pat. No. 4,738,654, which is incorporated herein by reference, a retention bracket, or retaining clip, is used to retain the pivot means or joint members in the apertures of the links of the chain assembly. The retaining clips include a horizontal back portion that transversely spans the links of the chain assembly, and depending arms joined to each end of the back that engage either a pivot means or an outer link surface.

However, the device disclosed in U.S. Pat. No. 4,738,654 does not employ a retention bracket to maintain the relative longitudinal positions of one or more separate chains. Moreover, the device disclosed in U.S. No. Pat. No. 4,738,654 is not suitable for use with a phased sprocket system, wherein the chain portion attached to one arm of the retaining clip engages a sprocket before the chain portion attached to the other arm of the retaining clip. In contrast, the present invention is directed to maintaining the relative longitudinal positions of two or more chains, including chains in a phased relationship.

SUMMARY OF THE INVENTION

The present invention relates to phased chain and sprocket assemblies or systems. Specifically, the present invention is directed to transmission, transfer case, or engine timing systems in which the sprockets are split into two or more portions or separate assemblies that are offset or phased with respect to each other. The sprocket portions each engage an individual chain assembly, where the individual chain assemblies are interconnected by a retention bracket to form a single composite chain assembly. Each chain assembly may be a roller chain, silent chain, or other type of chain design generally known in the art.

In one embodiment of the present invention, the sprockets of a chain and sprocket system are split into two portions, and the portions are offset or phased with respect to one another. Two individual chains are placed side-by-side on the sprockets in the phased relationship, and are held together by a series of retention brackets. Each retention bracket comprises a horizontal back portion and two arm portions that extend vertically downward (radially inward) from the ends of the back portion. The arm portions of the retention bracket are located adjacent to and on the outside of the innermost links of each individual chain assembly. The pivot means that are received in the apertures of the link plates are rotatably fitted through apertures in the arm portions. This rotatable connection between the arm portions of the retention bracket and the portions of the chain to which the arm portions are connected facilitates the use of the retention bracket in a phased system, wherein one chain engages a first sprocket before a second chain engages a second sprocket.

In another embodiment of the present invention, the sprockets of a chain and sprocket system are split into two portions, and the portions are offset or phased with respect to one another. Two individual chains are placed side-by-side on the sprockets in the phased relationship, and include guide links that may be in the form of circular washers. The individual chain assemblies are held together by a series of retention brackets. Each retention bracket comprises a horizontal back portion that extends transversely over the width of both chain assemblies, and two arm portions that extend vertically downward from the ends of the back portion. The arm portions are located laterally between the guide links and the outermost of the inner links of each individual chain assembly. The pivot means that are received in the apertures of the link plates are rotatably fitted through apertures in the arm portions of the retention bracket.

In another embodiment of the present invention, the sprockets of a chain and sprocket system are split into two portions, and the portions are offset or phased with respect to one another. Two individual chains are placed side-by-side on the sprockets in the phased relationship, and are held together by a series of retention brackets. Each retention bracket comprises a horizontal back portion, a curved portion at each of the two ends of the back portion, and arm portions that are connected to and extend vertically downward from the curved portions. The arm portions of the retention bracket are located adjacent to and on the outside of the innermost of the link plates of each individual chain assembly. The curved portions of the retention bracket cause the back portion thereof to be spaced apart from and above the upper edges of the innermost inverted tooth links. The pivot means that are received in the apertures of the inverted tooth and guide links are rotatably fitted through apertures in the arm portions.

BRIEF DESCRIPTION OF THE DRAWINGS

In the drawings, which are not to scale:

FIG. 2C is a schematic view of a portion of the phased chain assembly in the embodiment of the present invention depicted in FIG. 2A;

FIG. 2D is a side view of the three types of links in the phased chain assembly of the embodiment of the present invention depicted in FIG. 2A;

FIG. 2E is a perspective view of the retention bracket of the embodiment of the present invention depicted in FIG. 2A;

FIG. 3C is a schematic view of a portion of the phased chain assembly in the embodiment of the present invention depicted in FIG. 3A;

FIG. 3D is a side view of the two types of links in the chain assembly of the embodiment of the present invention depicted in FIG. 3A;

FIG. 3E is a perspective view of the retention bracket of the embodiment of the present invention depicted in FIG. 3A;

FIG. 5A is a partial top view of the retention bracket and chains of another embodiment of the present invention;

FIG. 5B is a partial perspective view the retention bracket and chains of the embodiment of the present invention depicted in FIG. 5A;

FIG. 5C is a partial side view of a portion of a chain of the embodiment of the present invention depicted in FIG. 5A; and FIG. 5D is an partial end cross-sectional view of the retention bracket and chains of the embodiment of the present invention depicted in FIG. 5A.

DETAILED DESCRIPTION OF THE PREFERRED EMBODIMENTS

The present invention is directed to providing a phased chain and sprocket assembly with a retention bracket interconnecting the chains of the assembly.

Figure 1:
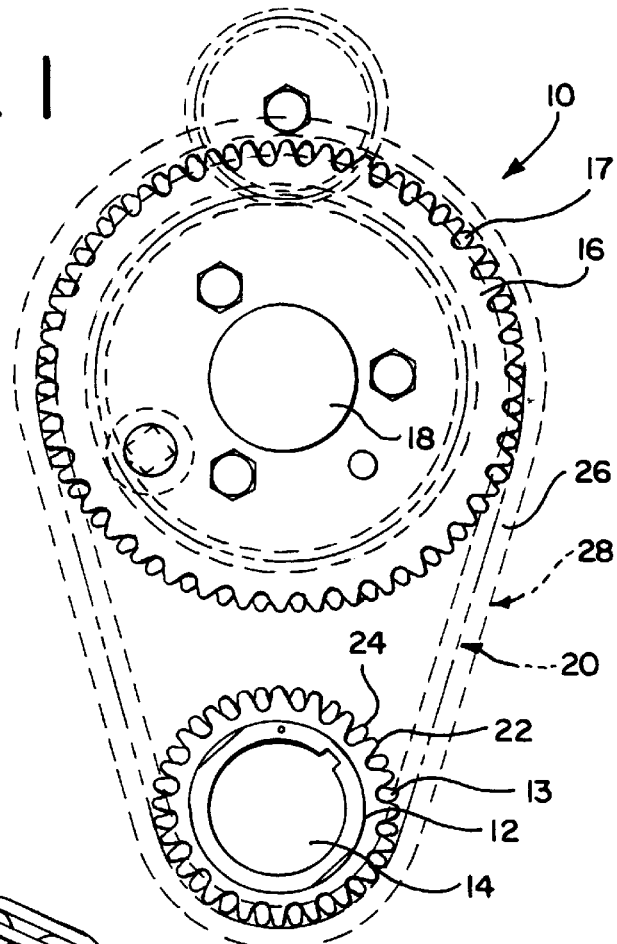
FIG. 1 is a schematic illustrating a chain and sprocket system of one embodiment of the present invention.

Turning now to the drawings, FIG. 1 shows a power transfer system 10 including a pair of driving sprockets 12, 13 located on a driving shaft 14 and a pair of driven sprockets 16, 17 located on a driven shaft 18. Rotation of the driving shaft 14 causes rotation of the driven shaft 18 through the chain and sprocket system 10.

Figure 2A:
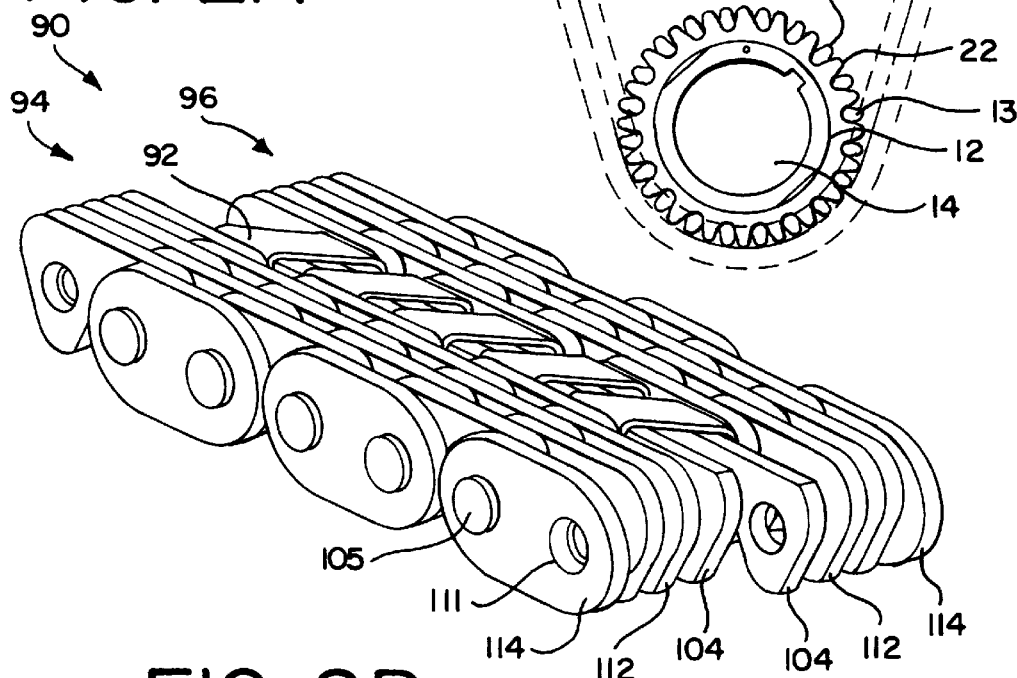
FIG. 2A is a perspective view of a portion of a chain assembly in one embodiment of the present invention.

In one embodiment of the present invention, shown generally at 90 in FIG. 2A, a retention bracket 92 interconnects two chain assemblies 94 and 96. The chain assemblies 94 and 96, which are shown as silent chains in FIG. 2A, may be, alternatively, roller chains or other types of chain generally known in the art. More specifically, the chain assemblies 94 and 96 include guide links 114 that are located along the lateral outside of the chains, interleaved sets of inside links 112, and innermost links 104. The chain assemblies 94 and 96 are phased with respect to one another by approximately one-half pitch, as shown in the top view of FIG. 2B, and are seated in phased sprocket portions 108 and 110, as shown in the schematic view of FIG. 2C. Alternatively, other modes of phasing, such as one-third or one-fourth pitch, could also be employed within the scope of the present invention.

As shown in FIG. 2D, the inside links 112 may be inverted tooth links that include an upper edge 116, depending teeth 118 that extend downward therefrom, and apertures 113. The teeth 118 of the inside links 112 engage the sprocket teeth (not shown) of the sprocket portions 108 and 110. The innermost links 104 are inverted tooth links that include an upper edge 101, depending teeth 107 that extend downward therefrom, and apertures 105. The distance 109 from the center of the aperture 105 to the upper edge 101 of the innermost links 104 is less than the distance 111 from the center of the aperture 113 to the upper edge 116 of the inside links 112. The shorter distance 109 allows the retention bracket 92 to be seated lower on top of the innermost links 104 than on the inside links 112, whereby the back portion 98 of the retention bracket 92 is co-planar with the upper edges 116 of the inside links 112. The guide links 114 include apertures 111, and do not engage the sprocket teeth.

Figure 2B:
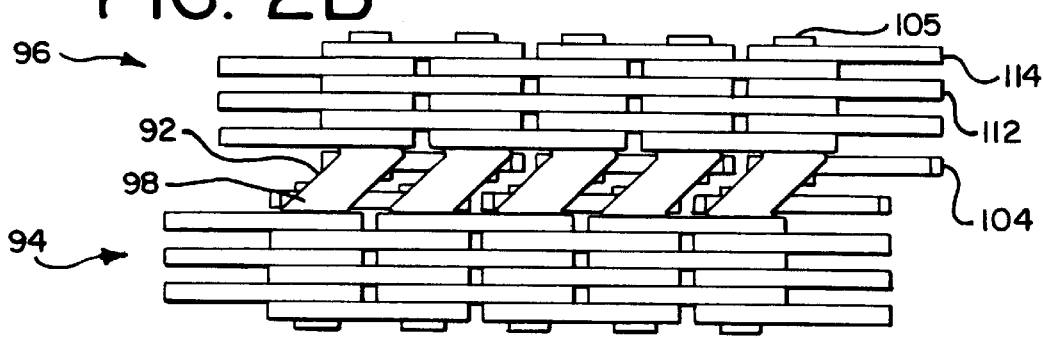
FIG. 2B is a top view of a portion of a chain assembly in the embodiment of the present invention depicted in FIG. 2A.

As shown in FIG. 2E, the retention bracket 92 includes a back portion 98, two arm portions 100 that extend downward from the ends of the back portion 98, and apertures 106 in the arm portions 100. The back portion 98 of the retention bracket 92 is diagonally transverse to the length of the chain assemblies 94 and 96, as shown in FIG. 2B, and extends across the upper edges of the inside links 112, as shown in FIG. 2C. The arm portions 100 are fit adjacent to the innermost links 104 of the chain assemblies 94 and 96. A pin 105 is rotatably fitted through the apertures 113 of the inside links 112, apertures 106 of the retention bracket 92, and the apertures 105 of the innermost links 104. The pin 105 is fixed in the apertures 111 of the guide links 114 by press fit or any other means known in the art. The pin is fit through the apertures 105 of the innermost links 104.

Figure 3A:
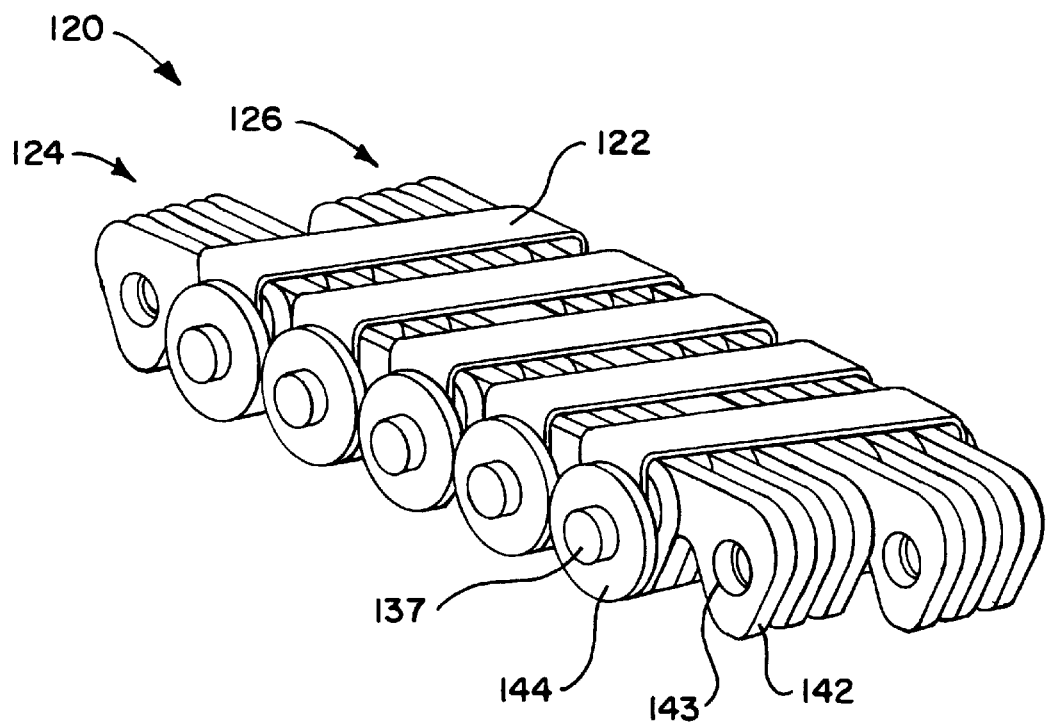
FIG. 3A is a perspective view of a portion of a chain assembly in one embodiment of the present invention.

In another embodiment of the invention, shown generally at 120 in FIG. 3A, a retention bracket 122 interconnects two chain assemblies 124 and 126. The chain assemblies 124 and 126, which are shown as silent chains in FIGS. 3A–3D, may be, alternatively, roller chains or other types of chain generally known in the art. The chain assemblies 124 and 126 include guide links 144 that are located along the outside of the chains, and interleaved sets of inside links 142. The chain assemblies 124 and 126 are phased with respect to one another by approximately one-half pitch, as shown in the top view of FIG. 3B, and are seated in phased sprocket portions 138 and 140, as shown in the schematic view of FIG. 3C.

As shown in FIG. 3D, the inside links 142 are inverted tooth links that include an upper edge 146, depending teeth 148 that extend downward therefrom, and apertures 143. The teeth 148 of the inside links 142 engage the sprocket teeth (not shown) of the sprocket portions 138 and 140. The guide links 144 may be in the form of a circular washer with a single aperture 141. Other types of guide links, including guide links having a pair of apertures for receiving pins, may also be used within the scope of the present invention. The guide links do not engage the sprocket teeth.

Figure 3B:
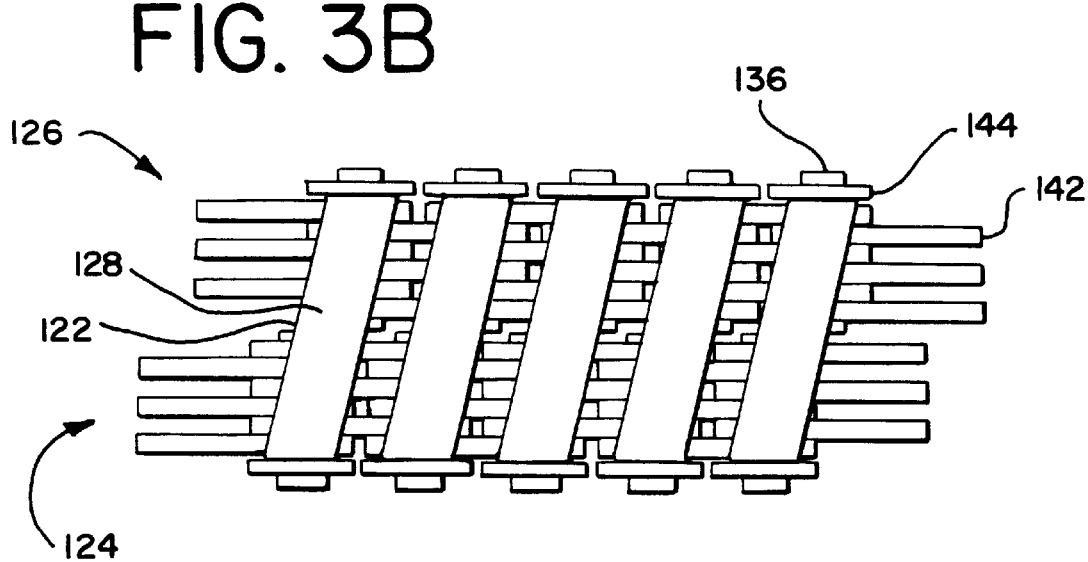
FIG. 3B is a top view of a portion of a chain assembly in the embodiment of the present invention depicted in FIG. 3A.

As shown in FIG. 3E, the retention bracket 122 includes a back portion 128, two arm portions 130 that extend downward from the ends of the back portion 128, and apertures 136 in the arm portions 130. The back portion 128 of the retention bracket 122 is diagonally transverse to the length of the chain assemblies, as shown in FIG. 3B, and is flush with the upper edges 146 of the inside links 142, as shown in FIG. 3C. The arm portions 130 are fit between the outermost of the inside links 142 and the guide links 144 of the chain assemblies 124 and 126. A pin 137 is rotatably fit through the apertures 143 of the inside links 142 and through the apertures 136 of the retention bracket 122. The pin 137 is fixed in the apertures 141 of the guide link 144 by press fit or any other means known in the art. The pin is fit through the apertures 143 of the innermost inside link 142.

Figure 4A:
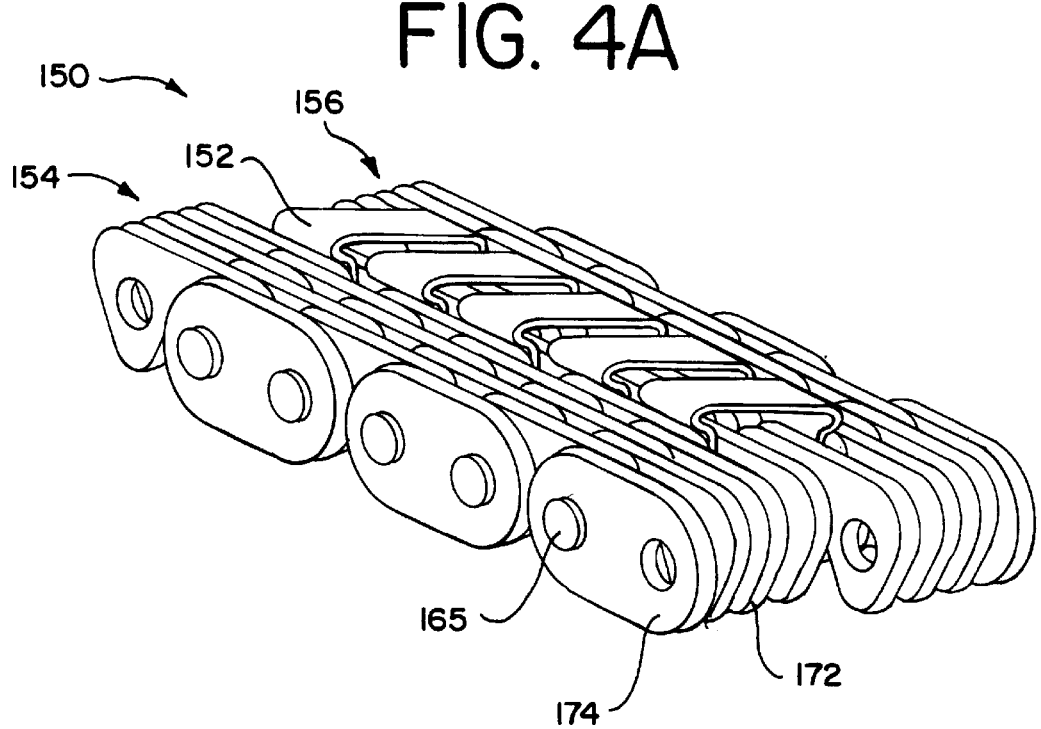
FIG. 4A is a perspective view of a portion of a chain assembly in one embodiment of the present invention.
Figure 4B:
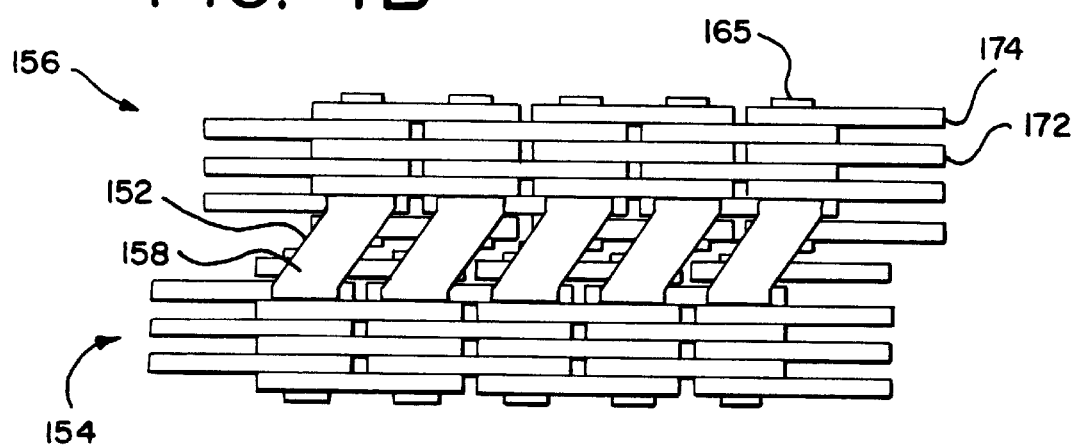
FIG. 4B is a top view of a portion of a chain assembly in the embodiment of the present invention depicted in FIG. 4A.
Figure 4C:
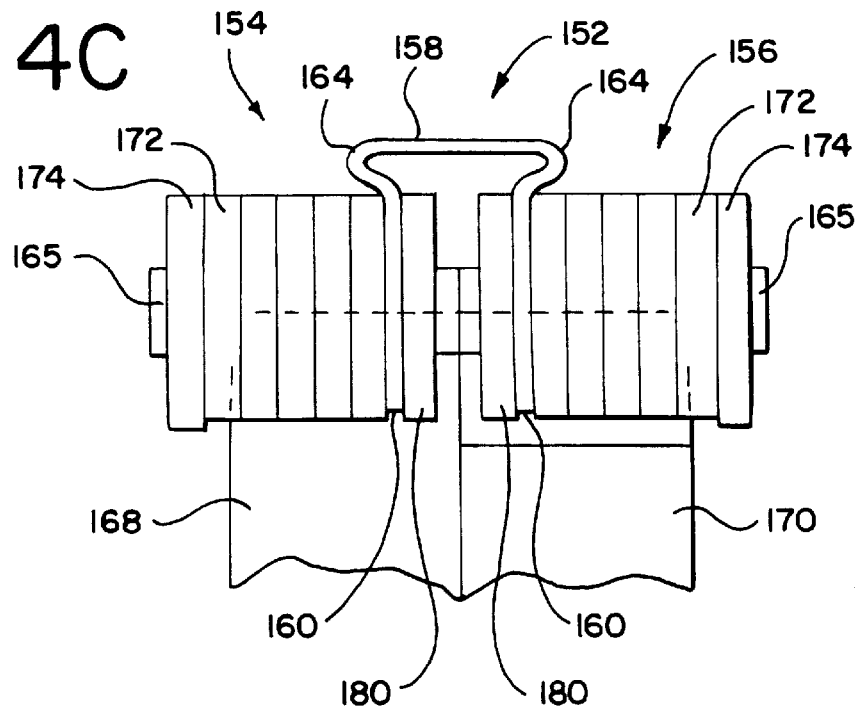
FIG. 4C is a schematic view of a portion of the phased chain assembly in the embodiment of the present invention depicted in FIG. 4A.

In another embodiment of the present invention, shown generally at 150 in FIG. 4A, a retention bracket 152 interconnects two chain assemblies 154 and 156. The chain assemblies 154, 156, which are shown as silent chains in FIGS. 4A–4D, may be, alternatively, roller chains or other types of chain generally known in the art. The chain assemblies 154 and 156 include guide links 174 that are located along the outside of the chains, and interleaved sets of inside links 172. The chain assemblies 154 and 156 are phased with respect to one another by approximately one-half pitch, as shown in the top view of FIG. 4B, and are seated in phased sprocket portions 168 and 170, as shown in the schematic view of FIG. 4C.

Figure 4D:
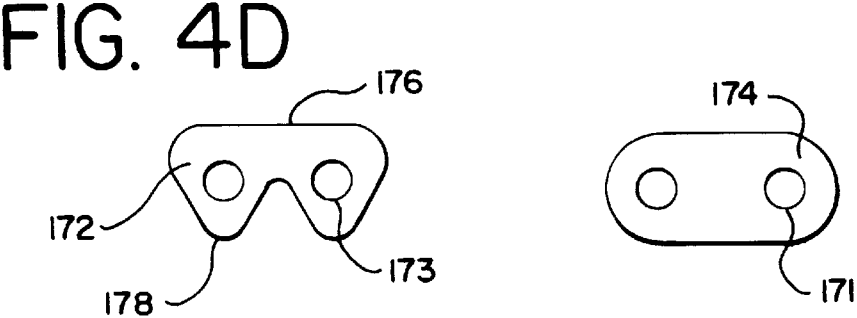
FIG. 4D is a side view of the two types of links in the chain assembly of the embodiment of the present invention depicted in FIG. 4A.

As shown in FIG. 4D, the inside links 172 are inverted tooth links that include an upper edge 176, depending teeth 178 that extend downward therefrom, and apertures 173. The teeth 178 of the inside links 172 engage the sprocket teeth (not shown) of the sprocket portion 168 and 170. The guide links 174 include apertures 171, and do not engage the sprocket teeth.

Figure 4E:
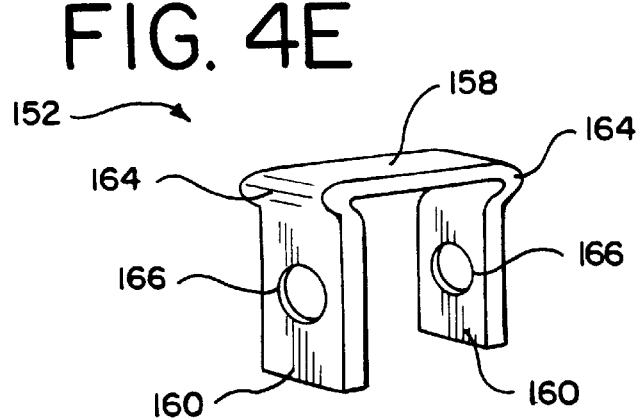
FIG. 4E is a perspective view of the retention bracket of the embodiment of the present invention depicted in FIG. 4A.

As shown in FIG. 4E, the retention bracket 152 includes a back portion 158, two arm portions 160 that extend downward from the ends of the back portion 158, and apertures 166 in the arm portions 160. The retention bracket 152 also includes curved connecting portions 164 that join the ends of the back portion 158 to the arm portions 160. The back portion of the retention bracket is spaced apart from the upper edges 176 of the inner links 172. The arm portions 160 are fit adjacent to, and on the outside of, the innermost inside link 180 of the chain assemblies 152 and 154. A pin 165 is rotatably fitted through the apertures 173 of the inside links 172 and the apertures 166 of the retention bracket 152. The pin 165 is fixed in the apertures 171 of the guide links 174 by press fit or any other means known in the art. The pin is fit through the apertures 173 of the innermost inside link 180.

In another embodiment of the present invention, shown generally in FIGS. 5A, 5B, 5C, and 5D, a plurality of roller chain assemblies 214, 216 are connected by a plurality of retention brackets 212. Each roller chain assembly comprises a plurality of link plates 220, interleaved by pins 222. Typically, each roller chain includes outer link plates 224 and inner link plates 226. The pins are tightly received in apertures 228 in the outer link plates, while bushings 230 are received in apertures 232 in the inner link plates. The pins are rotatably received in the bushings of the inner link plates. Rollers 234 may be positioned on the bushings. The bushings freely rotate about the pins, so that the inner link plates 226 are pivotally connected to the outer link plates 224 and are therefore able to articulate with respect to the outer link plates.

As the chain engages a sprocket (not shown), the teeth of the sprocket are received laterally between the link plates 220. In the longitudinal direction, the sprocket teeth are received between the rollers 234, if rollers are deployed, or between the bushings 230, if rollers are not deployed.

As shown in the FIGS. 5A, 5B, and 5C, the retention bracket 212 connects each pair of adjacent roller chain assemblies 216, 216. The retention bracket includes a back portion 240 and a pair of arm portions 242, 244. Because the chain assemblies 214, 216 may be phased, the back portion extends longitudinally along each chain assembly. A first arm portion is pivotally connected to a first chain assembly 214, while a second arm portion 244 is pivotally connected to a second chain assembly 216. To accomplish this pivotal connection, an aperture (not shown) in each arm portion 242, 244 rotatably receives a pin 222 or bushing 230 of the corresponding chain assembly.

As the chain assemblies approach and engage the corresponding sprockets, the phasing of the chains causes one chain assembly to engage a sprocket prior to the engagement of the other chain and sprocket. The rotational connection between the retention bracket and the chain assemblies facilitates this staggered engagement.

As shown in FIG. 5D, each roller chain 214, 216 may include a link plate 250, 252 having a height which is less than the height of the other link plates 254, 256. In the embodiment of the present invention shown in FIG. 5D, each arm 242, 244 of the retention bracket is laterally positioned between a link plate of lesser height 250, 252 and a link plate of greater height 254, 256. This positioning allows the back portion to be positioned above the lesser height link plates 250, 252, and allows the retention bracket to have the same height as the link plates of greater height 254, 256.

In addition to the embodiment shown in FIG. 5D, other retention bracket designs may also be employed within the scope of the present invention. For instance, the retention bracket 122 shown in FIGS. 3A–3E, which connects to the chain assemblies between the laterally outside inner link plates 145 and the guide link plates 144, may be employed with roller chain assemblies within the scope of the present invention. Alternatively, the retention bracket 152 shown in FIGS. 4A–4E, which has a back portion 158 which extends above (radially outside) the upper edges 176 of the link plates 172 of the chain assemblies 154, 156, may be employed with roller chain assemblies within the scope of the present invention.

While several embodiments of the invention are illustrated, it will be understood that the invention is not limited to these embodiments. Those skilled in the art to which the invention pertains may make modifications and other embodiments employing the principles of this invention, particularly upon considering the foregoing teachings.

What is claimed is:

1. A phased chain and sprocket assembly, comprising:
   first and second driving sprockets assembled in parallel relationship on a driving shaft, said first and second driving sprockets each having an outer periphery and a plurality of teeth along said outer periphery, said teeth of said first driving sprocket being circumferentially offset with respect to said teeth of said second driving sprocket;
   said teeth of said first driving sprocket engaging a first chain, said first chain comprising a plurality of link plates interleaved in the longitudinal and lateral directions by pins, said teeth of said second driving sprocket engaging a second chain, said second chain comprising a plurality of link plates interleaved in the longitudinal and lateral directions by pins;
   first and second driven sprockets assembled in parallel relationship on a driven shaft, said first and second driven sprockets each having an outer periphery and a plurality of teeth along said outer periphery, said teeth of said first driven sprocket being circumferentially offset with respect to said teeth of said second driven sprocket;

said teeth of said first driven sprocket engaging said first chain and said teeth of said second driven sprocket engaging said second chain;

a plurality of retention brackets, each of said brackets interconnecting said first and second chains.

2. The chain and sprocket assembly of claim 1 wherein:

said first chain includes inner link plates and guide link plates, said guide link plates positioned on the lateral outside of said first chain.

3. The chain and sprocket assembly of claim 1 wherein:

each said retention bracket comprises a back portion connecting a plurality of arm portions;

a first said arm portion connected to said first chain, a second said arm portion connected to a second said chain.

4. The chain and sprocket assembly of claim 3, wherein:

each said first arm portion of each said retention bracket is pivotally connected to said first chain, and each said second arm portion of each said retention bracket is pivotally connected to said second chain.

5. The chain and sprocket assembly of claim 4, wherein:

each said arm portion of each said retention bracket includes an aperture, said aperture positioned to receive a said pin therein.

6. The chain and sprocket assembly of claim 3, wherein:

said first arm portion of each said retention bracket is connected to a said pin of said first chain, and said second arm portion of each said retention bracket is connected to a said pin of said second chain.

7. The chain and sprocket assembly of claim 3, wherein:

said first chain comprises a row of link plates including an innermost link plate positioned laterally adjacent to said second chain;

said second chain comprises a row of link plates including an innermost link plate positioned laterally adjacent to said first chain;

a first said retention bracket has a said first arm connected to said innermost link plate of said first chain; and said first retention bracket has a said second arm connected to said innermost link plate of said second chain.

8. The chain and sprocket system of claim 7, wherein:

said row of link plates of said first chain includes a second link plate;

said innermost link plate of said row of said first chain has a first height in the radial direction, said second link plate of said row of said first chain has a second height in the radial direction;

said second height being greater than said first height.

9. The chain and sprocket assembly of claim 8, wherein:

said retention bracket has a height measured in the radial direction; and said height of said retention bracket is equal to said second height of said second link plate.

10. The chain and sprocket assembly of claim 7, wherein said innermost link plate of said first chain is positioned laterally between said first arm of said retention bracket and said second chain.

11. The chain and sprocket assembly of claim 3, wherein:

said first chain comprises a row of link plates including an outermost link plate positioned on the lateral outside of said row and a second link plate positioned laterally inward of said outermost link plate; and said first arm portion of a said retention bracket positioned laterally between said outermost link plate and said second link plate of said row.

12. The chain and sprocket assembly of claim 11, wherein said outermost link plate is a guide link plate.

13. The chain and sprocket assembly of claim 7, wherein:

each said retention bracket has a height measured in the radial direction;

each said link plate has a height measured in the radial direction; and said height of each said retention bracket is greater than said height of said innermost link plate of said first chain and said height of said innermost link plate of said second chain.

14. The chain and sprocket assembly of claim 1, wherein:

said first and said second chains each comprise a plurality of inner link plates, said inner link plates each including a body portion and a plurality of downward extending tooth portions;

said tooth portions configured and positioned to engage said teeth of said driving and driven sprockets.

15. The chain and sprocket assembly of claim 14, wherein:

said first and said second chains each further comprise a plurality of guide link plates.

16. The chain and sprocket assembly of claim 1, said first and said second chains each further comprising:

said link plates forming a series of interleaved inner and outer links, each outer link including a pair of outer link plates fixedly mounted to said pins, each outer link plate having a pair of apertures for receiving said pins;

each inner link including a pair of inner link plates fixedly mounted on bushings, said bushings disposed to turn on said pins, each said inner link plate having a pair of apertures for receiving said bushings;

each of said inner links and said outer links adapted to receive a said sprocket tooth.

17. The chain and sprocket system of claim 16, wherein said bushings of said inner links are surrounded by cylindrical rollers that are freely rotatable about said bushings for engagement with said sprocket teeth.

18. The chain and sprocket system of claim 16, wherein:

each said retention bracket comprises a back portion connecting a plurality of arm portions;

a first said arm portion connected to said first chain, a second said arm portion connected to a second said chain.

19. The chain and sprocket system of claim 18, wherein said first arm portion is positioned laterally between a said outer link plate and a said inner link plate.

20. The chain and sprocket system of claim 1, wherein said teeth of said first driving sprocket are circumferentially offset with respect to said teeth of said second driving sprocket by the angular width of one half of one said sprocket tooth.

* * * * *